July 27, 1937.  R. TELLIEZ  2,088,540
CHANGE SPEED DEVICE WITHOUT BREACH OF CONTINUITY
Filed Feb. 7, 1935   2 Sheets-Sheet 1
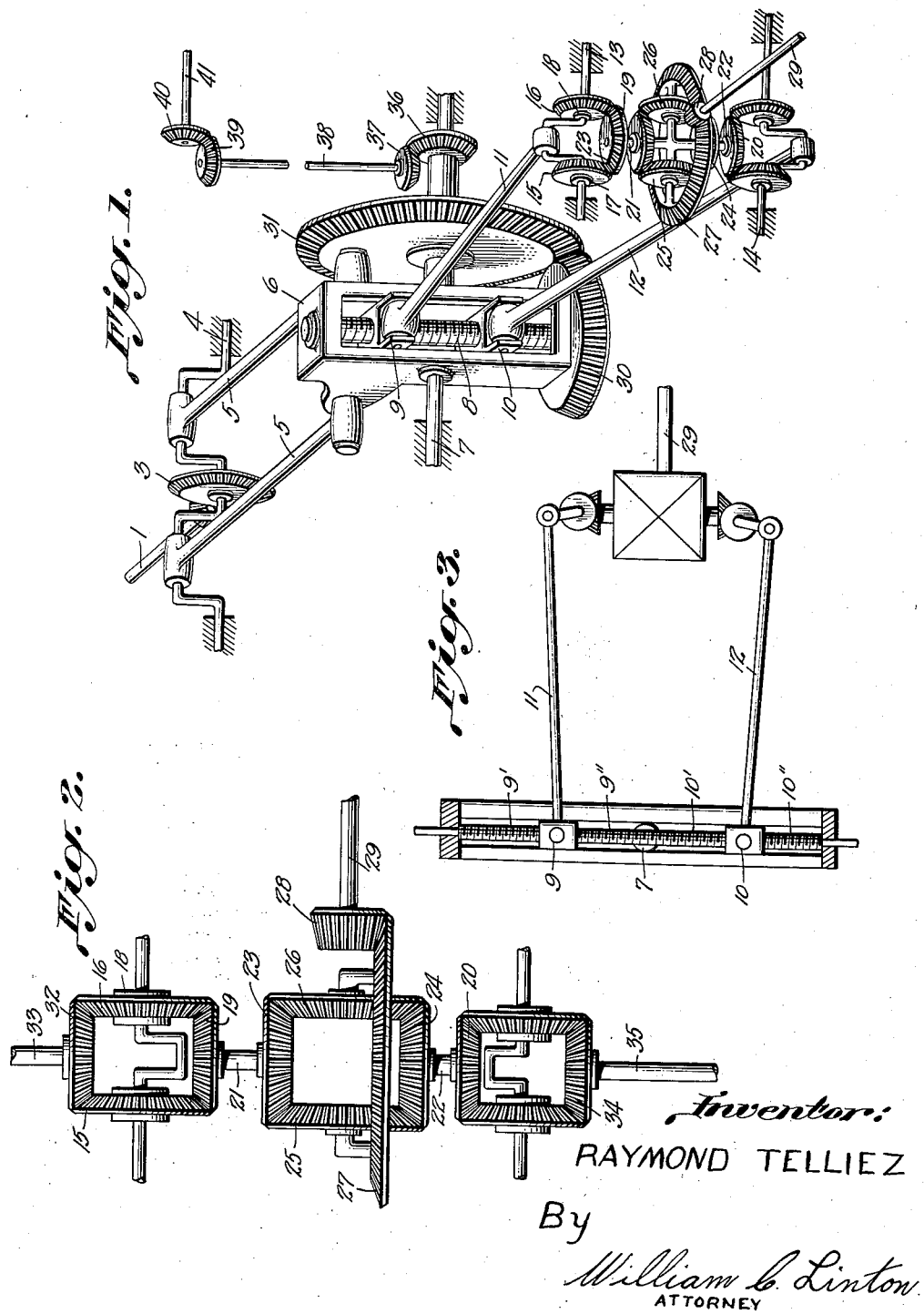
Inventor:
RAYMOND TELLIEZ
By
William C. Linton
ATTORNEY

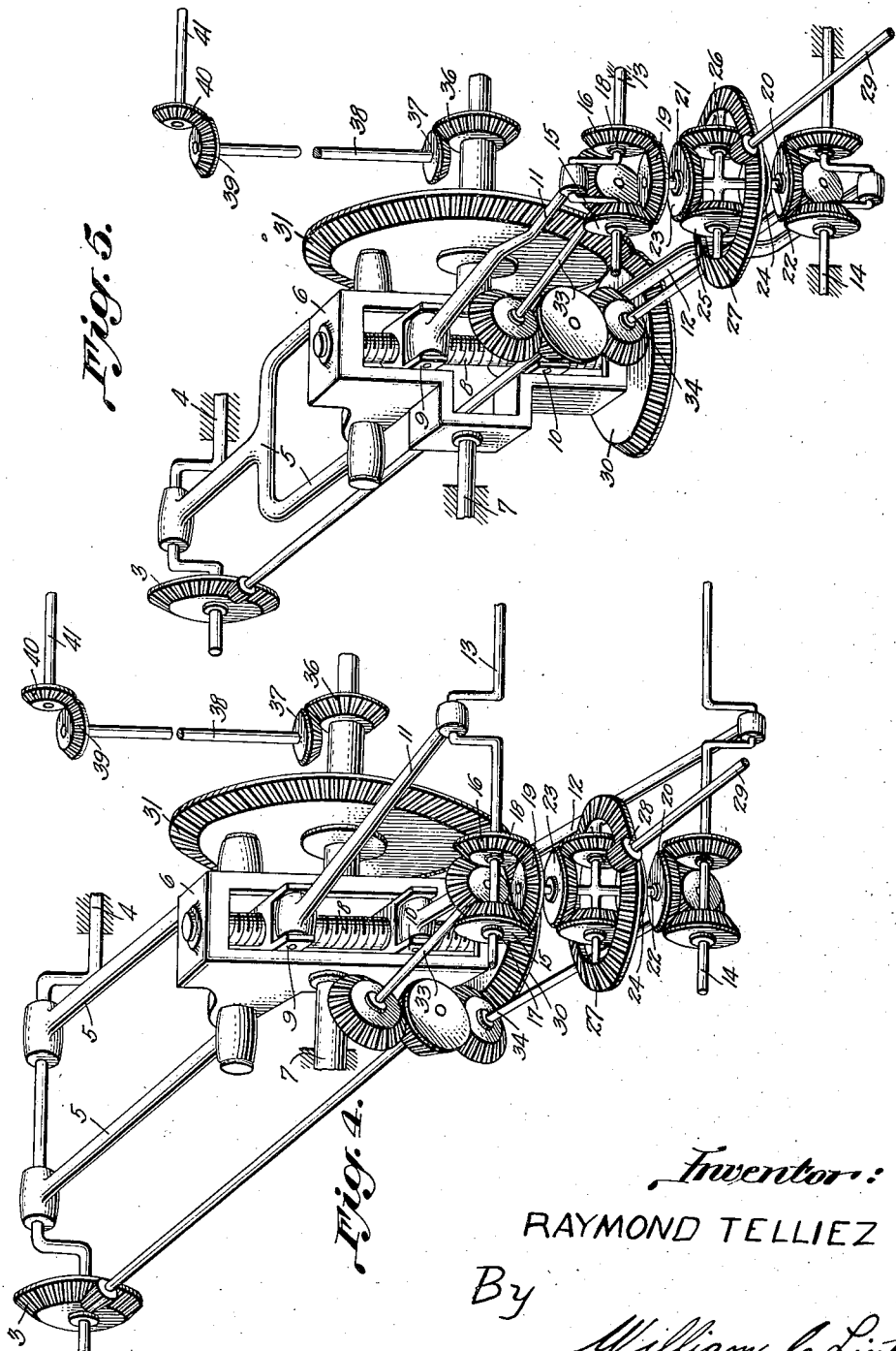

Patented July 27, 1937

2,088,540

UNITED STATES PATENT OFFICE 2,088,540

CHANGE SPEED DEVICE WITHOUT BREACH OF CONTINUITY

Raymond Telliez, Paris, France

Application February 7, 1935, Serial No. 5,359
In France February 12, 1934

3 Claims. (Cl. 74—283)

The present invention relates to change-speed devices, and has for its object a mechanism permitting a continuous range of speeds irrespective of the direction of rotation of the drive shaft.

The device according to the invention is chiefly adapted for use upon motor vehicles. An interesting application may also be considered in connection with aviation, by interposing the device between the engine and the propeller, in order to facilitate the braking when landing, by the reversal of the propeller blades, or to provide a variable speed-reduction, etc. It may obviously be applied to other machines employing speed-changing devices.

The present change-speed device, which is applied by way of example to motor vehicles, has a special feature in that it permits the speed of the vehicle to vary in a continuous manner and in forward or back drive, while passing through a dead center, and without the use of a clutch or similar means.

The said device permits driving by means of the acceleration, but it differs from the so-called automatic speed-changing devices for the reason that the driver will always have control over the ratio between the power torque and the load torque, and hence over all increase of speed such as are necessary to easy driving. The driver may vary this ratio at any time, as he may desire, between all values comprised between two limits, and is not obliged to use predetermined values as in the case of the known change-speed devices.

There is further employed a device for correcting any free wheeling effect created and providing for the braking by means of the engine, which is indispensable for the majority of drivers.

The principle of the invention will be described with reference to the accompanying drawings. Fig. 1 showing a change-speed device for motor vehicles. Figs. 2 and 3 are diagrammatic views showing the detail of operation.

As shown in Fig. 1 the driving shaft 1 actuates, through a known speed-reducing device 2 and 3 a crankshaft 4 to which the gear-wheel 3 is keyed. Connecting rods 5 transmit the rotary motion of the shaft 1, which has been set in motion by the crankshaft 4, to a rocking device 6, thus imparting to it an oscillating movement about a rock bar 7.

The said rocking device comprises a threaded rod 8 along which are movable the sliders 9 and 10 which are respectively connected with two connecting-rods 11 and 12.

Each of the said connecting rods is connected with a respective crankshaft 13—14, and with each shaft is combined the device which will be described as follows.

It will be readily observed that the mechanism is, so to speak, divided into two parts, one of which is operated by the rod 11 and the other by the rod 12. The movements of the two rods are then combined and compensated by a mechanism based on the principle of differential gears, and their reciprocating motion is transformed, in turn, into a rotary motion, which is definitely transmitted to the drive shaft 29.

The upper part which is operated by the rod 11 will be taken as an example. Two bevel gears 15 and 16 are mounted on the shaft 13, and are rotated through the medium of a ratchet device 17—18 (Fig. 2) employing rollers, for instance, or by any other similar device, the action of said bevel gears depending upon the rotation of the shaft 13 the bevel gears being rotatable in a single direction.

On the other hand, owing to the construction, the two gears 15 and 16 can be operated in the other direction in such a way that when the shaft 13 rotates (for instance) in the clockwise direction the gear 15 is operated, and the gear 16 remains loose, but when the shaft 13 rotates in the anti-clockwise direction, the gear 16 is operated, and the gear 15 remains loose.

The gears 15 and 16 are both engaged with a third bevel gear 19, which always rotates in the same direction, irrespective of the direction of rotation of the shaft 13.

The shaft 14, which is operated by the rod 12, is provided with a device which is similar to the preceding, and causes a rotation of the bevel gear 20, but in the contrary direction to the gear 19.

The gears 19 and 20 impart their respective movements to two shafts 21 and 22, upon each of which is mounted a main gear-wheel of a differential set, said gear-wheels being shown as 23 and 24. The planetary gears, which run loose on their shafts, are shown as 25 and 26. The toothed ring 27 is driven by said planetary gears, and it drives the bevel pinion 28, which in turn actuates the drive shaft 29. The said shaft 29 is in this case the longitudinal power transmission shaft of the vehicle.

The threaded rod 8 is provided at one end with a gear-wheel 30 which is keyed to the same, and which engages a gear wheel 31 connected with a gear 36, both gears being loose on the rock bar 7. The pinion 36 may be operated from a distant point by means of a driving set comprising bevel gears 37, 38, 39, 40, 41, etc., leading to a device which may be operated by the driver. By this means, the wheel 31 can be turned in order to displace the sliders 9 and 10 along the threaded rod.

In view of the foregoing, a certain position of the sliders 9 and 10 will be considered, such that the sliders will be at equal distances from the axis of oscillation 7.

Whenever by the rate of rotation of the driving shaft 1 and, as a consequence the rate of oscillation of the rocking device 6, the elongations of the rods 11 and 12 are equal, the shafts 13 and 14 are actuated at equal rates of oscillation and the pinions 19 and 20, the shafts 21 and 22, and finally the main gears 23 and 24 will rotate in contrary directions, at angular speeds whose absolute value is equal.

In such conditions, it is evident that the planetary pinions 25 and 26 will rotate loosely on their shafts, without driving the ring 27. Hence the shaft 29 will remain stationary.

This position corresponds to the dead center.

It will now be supposed that the driver acts upon the wheel 31 in such way that the slider 9 recedes from the shaft 7 and assumes the position $9^1$, and that the slider 10 approaches the shaft 7, and assumes the position $10^1$.

As the elongation of the rod 11 exceeds the elongation of the rod 12 during the unit of time, the angular speed of the shaft 13 will exceed the angular speed of the shaft 14.

It will follow that by degrees, the main wheels 23 and 24 will rotate at speeds $\omega$ and $\omega'$ which differ in absolute value.

In these conditions, it is evident that the toothed ring will rotate at a resulting speed U equal to $$\frac{\omega + \omega'}{2}$$

Thus the shaft 29 is actuated, and the vehicle will start, for instance in a forward motion, if the speeds $\omega$ being greater than $\omega'$, will afford the proper direction.

If the lack of balance should be increased between the positions of the sliders 9 and 10 with reference to the center of oscillation 7, the rate of rotation of the ring 27 will increase in like manner up to the maximum which is given by the preceding formula and which will take place for $\omega'=0$ in which case $$U=\frac{\omega}{2}$$

In this position, the slider 10 is located on the axis 7, and the slider 9 is at the end of its movement. Hence this will afford a continuous range of speeds from 0 to a maximum, which may, by construction, owing to the ratios of the interposed gearing, be equal to the actual rate of rotation of the driving shaft, which is equal to the speed in direct drive, or may even exceed this latter (increased speed ratio).

It will be thus observed that if the driver causes the wheel 31 to turn in the opposite direction, i. e. if the slider 9 approaches the slider 7 and is located at 9'', and if the slider 10 recedes from the other and is located at the point 10'', the contrary effects will be produced, and the vehicles will move backwards, since the ring 27 rotates in the contrary direction. In like manner, this will afford a continuous increase of speed in reverse drive, up to a maximum which is obtained as in the preceding case, and especially if the slider 9 should come to the point 7, and the slider 10 should be at the end of its movement.

A like result will be obtained in the case in which only one of the main gears 23 and 24 is connected by a shaft 21 with a pinion 19, the other main gear 24 being continuously actuated by the driving shaft. In this case, in fact, it will be sufficient to employ a single connecting rod 11 or 12, and a single slider 9 or 10. For a middle position of the slider on the rod 8, the main gear 23 will have the same speed as the main gear 24, but in the contrary direction, and this position corresponds to the dead center. Accordingly the driver moves the said slider to one or the other side of its middle position, this will produce continuous variations of speed, as above indicated either in forward or in reverse drive.

As above described and as supplied to a motor vehicle, such a device for the transmission of movement will not provide for braking by the engine, and thus it resembles a free wheeling drive.

In fact, if the vehicle is supposed to travel at a given speed on a level road, if a sudden reduction of the load torque should occur, for instance if the vehicle proceeds upon a down grade, the shaft 29 will rotate at an increased speed, as well as the main wheels 23 and 24 and the pinions 19 and 20, since these are in fact operated in the same direction.

On the other hand, if the accelerator is suddenly released, the pinions 19 and 20 will only be given a reduced impulse, and will tend to run loose, as they are driven by the transmission device.

It is only in the case in which the speed of the gear 32 becomes higher than the shaft 33, that the retarding action of the engine will not allow the shaft 33 to attain this rate. The construction is such that for a given speed of the engine, the values of the speeds of the gears 32 and of the shaft 33 will be equal when the slider 9 is in the position for the maximum forward drive of the car (end of the stroke). For all the intermediate positions of the slider 9, in which the rate of rotation of the wheel 32 is less, the shaft 33 will rotate at a higher rate than the wheel, and hence it will not brake this latter.

The same considerations will apply in the case of another wheel 34 and a shaft 35 operating in connection with the wheels on the crankshaft 14.

From this it will result that when the car is running on a level road, in the position of the maximum forward drive, if the accelerator should be suddenly released, the pinion 32, which is driven by the wheels, through the driven shaft 29 and the pinion 19, will maintain its speed, while the speed of the shaft 33—connected with the engine— will at once decrease, thus abruptly braking the pinion 32 in the manner above indicated.

On the other hand, without interfering with the accelerator, if the resistance load should be reduced (on a down-grade), the wheel 32 will have a tendency to race, but the wheel 33 will check this racing, as it is connected with the engine.

If it be supposed that when the car is running on a level grade, and in the position for the maximum forward speed, the driver should wish to employ an additional speed increase, he will act upon the rod-and-link gear in such way that the slider 9 will approach the axis 7 and that the slider 10 will recede from the same. By increasing the engine speed at the same time, he will increase the power torque, thus affording an increase of speed which is as powerful as may be desired.

On the contrary, if the driver should not increase the speed, but should release the accelerator pedal, the engine will brake the wheel 32 which would thus tend to increase its speed, as the ring 27, whose rotation depends upon the difference of speeds ω—ω', will tend to maintain its instantaneous value, whereas ω' will increase, since the slider 10 is at a distance from the axis of oscillation 7.

Like considerations will apply in the case of the pinions connected with the shaft 14, and thus the braking by the engine, by means of the shaft 35, will also be obtained for all positions of back drive.

Thus the new change-speed device will afford:

1.—The elimination of the uncoupling, as the sliders 9 and 10 are placed for this purpose in a symmetrical position.

2.—A range of speeds, which is continuous from a zero value to a maximum value.

3.—The braking by the engine, irrespectively of the gear reduction ratio.

4.—The driving of the car on the loose wheel principle.

The same considerations are applicable to the back drive.

It should be observed that a speed-change device of this character is well adapted for the propulsion of vehicles by their front wheels, owing to its simplified form due to the elimination of clutch devices, which are always complicated.

Having so described my said invention and how it is performed I declare that what I claim is:

1. A variable speed drive comprising a drive shaft, a rocker means mounted on a rockshaft, means driven by said drive shaft for oscillating said rocker means, a threaded rod rotatably mounted on said rocker means, sliders threaded to work on said rod, connecting rods pivotally mounted at one end to said sliders, crank shafts having one end of said connecting rods pivotally mounted thereto, a differential train of gears, means operatively connecting said train of gears to said crank shafts, a drive shaft, and a gear mounted on said shaft connected to one gear of said train of gears.

2. A variable speed drive comprising a drive shaft, a rocker means mounted on a rockshaft, a crank shaft, a bevel gear connected to the center of said crank shaft, a pinion mounted on one end of said drive shaft and in connection with said bevel gear, connecting rods mounted on said crank shaft and pivotally connected to said rocker means, a threaded rod rotatably mounted on said rocker means, sliders threaded to work on said rod, connecting rods pivotally mounted at one end to said sliders, crank shafts having one end of said second mentioned connecting rods pivotally mounted thereon, a differential train of gears, means operatively connecting said train of gears to said second mentioned crank shafts, a drive shaft, and a gear mounted on said drive shaft connected to one gear of said train of gears.

3. A device of the character described comprising a drive shaft, a rocker means mounted on a rockshaft, means driven by said drive shaft for oscillating said rocker means, a threaded rod rotatably mounted on said rocker means, sliders threaded to work on said rod, connecting rods pivotally mounted at one end to said sliders, crank shafts having one end of said connecting rods pivotally mounted thereto, a differential train of gears, means operatively connecting said train of gears to said crank shafts, a drive shaft, and a gear mounted on said drive shaft connected to one gear of said train of gears and means operatively connecting said train of gears to said first mentioned drive shaft.

RAYMOND TELLIEZ.